No. 806,225. PATENTED DEC. 5, 1905.
W. G. WINANS.
CAR FENDER.
APPLICATION FILED APR. 5, 1905.
2 SHEETS—SHEET 1.
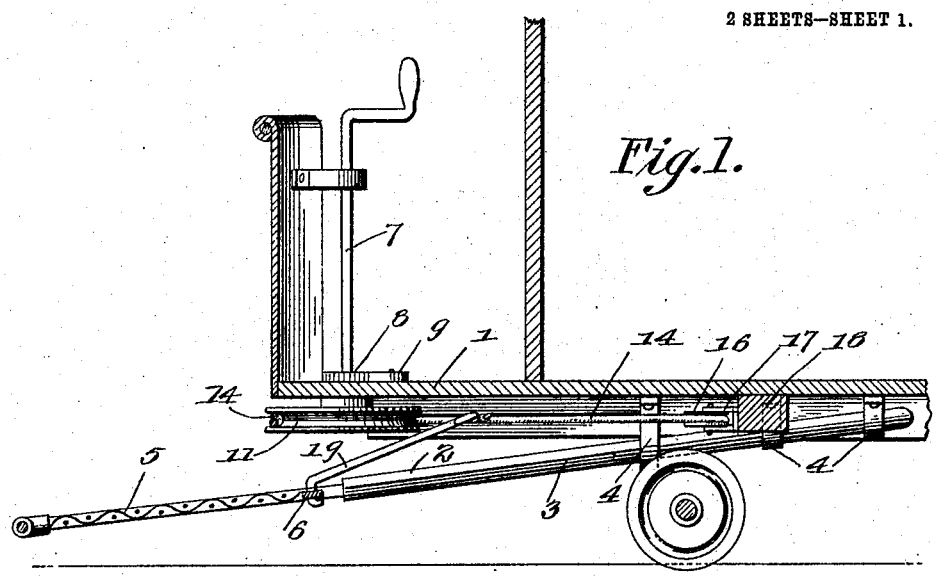
Fig. 1.
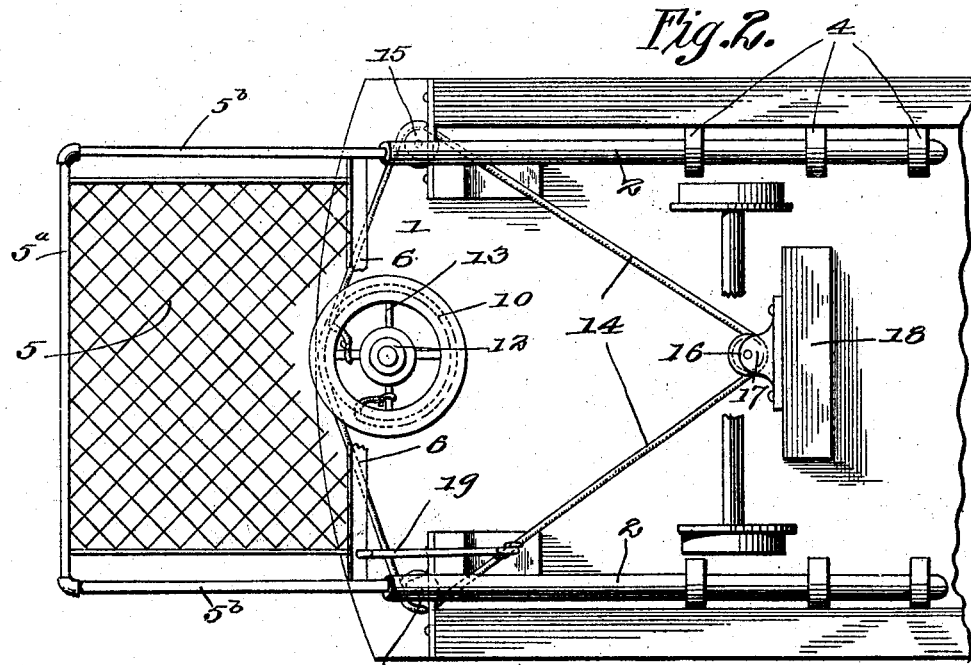
Fig. 2.
Fig. 3.
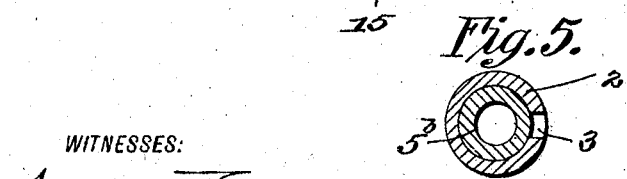
WITNESSES:
Samuel E. Wade
Geo. S. Brock
INVENTOR
WESLEY G. WINANS
BY Munn & Co.
ATTORNEYS No. 806,225. PATENTED DEC. 5, 1905.
W. G. WINANS.
CAR FENDER.
APPLICATION FILED APR. 5, 1905.
2 SHEETS—SHEET 2.
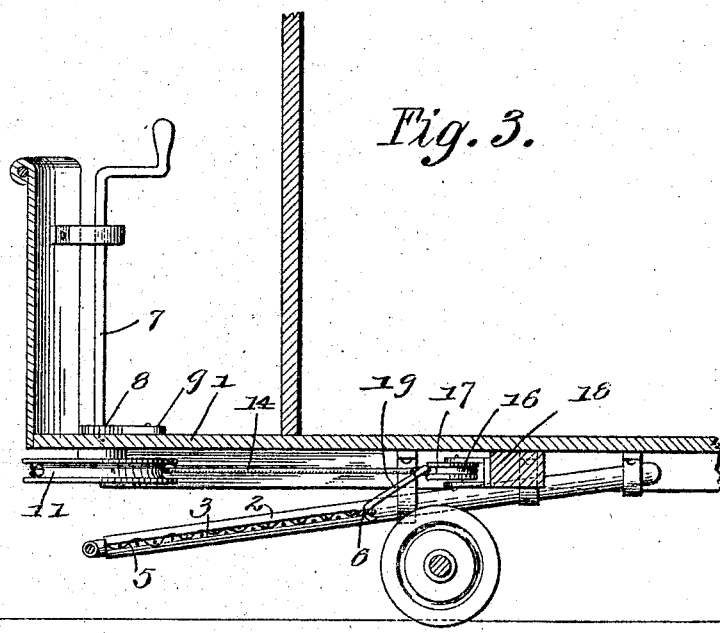
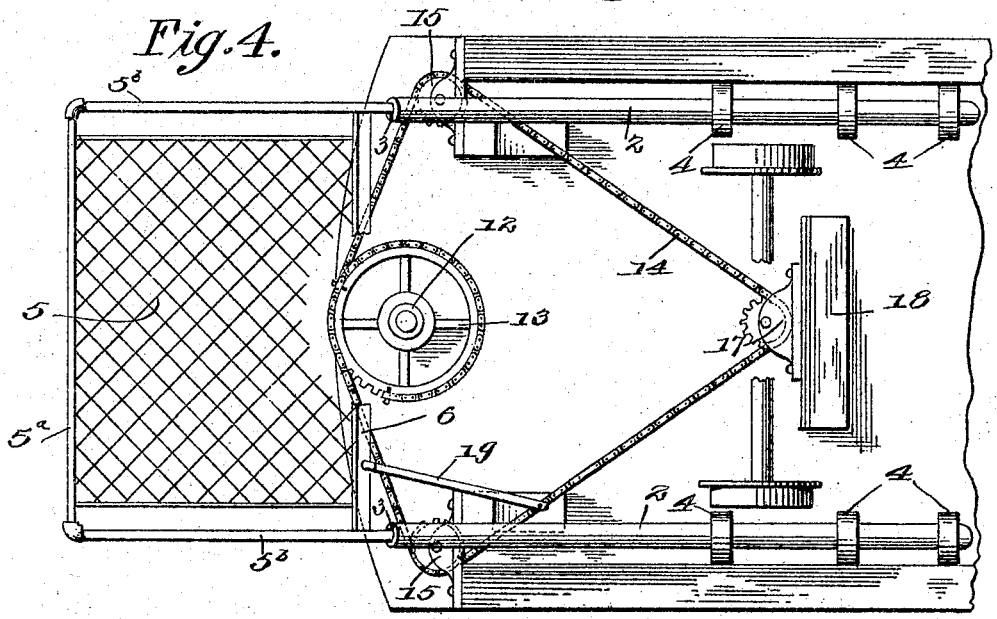
WITNESSES:
INVENTOR
WESLEY G. WINANS
BY
ATTORNEYS

UNITED STATES PATENT OFFICE.

WESLEY GEORGE WINANS, OF SPOKANE, WASHINGTON.

CAR-FENDER.

No. 806,225.          Specification of Letters Patent.          Patented Dec. 5, 1905.

Application filed April 5, 1905. Serial No. 254,019.

*To all whom it may concern:*

Be it known that I, WESLEY GEORGE WINANS, a citizen of the United States, and a resident of Spokane, in the county of Spokane and State of Washington, have invented certain new and useful Improvements in Car-Fenders, of which the following is a specification.

My invention relates to improvements in car-fenders, being particularly adapted for use in connection with electric or other power-driven street-cars.

Heretofore the fenders commonly used have mostly been either fastened permanently in the front or rear of the car or else so made as when not in use they can be raised against the dashboard or platform of the car, compelling the motorman or some other person when the car reaches the end of the line to raise the fender at one end of car and lower the one at the other end, thus consuming considerable time and labor. Then, again, with fenders in common use when two cars so equipped are approaching each other on a curve one of them is compelled to stop while the other passes in order to prevent the fenders striking each other, as they project beyond the tracks on curves. Furthermore, with the fenders in common use they project so far over the track that in rounding curves it is extremely dangerous to persons or vehicles that may happen to be on the curve or corner of a street at the time the car is making the curve.

The object of my invention is to obviate the above-mentioned objections and defects; and it consists in certain novel features of construction, arrangement, and combination of parts, as will be hereinafter fully described, and pointed out in the claims.

Figure 1 is a vertical section showing a portion of a car equipped with my improvement. Fig. 2 is a bottom plan view of a portion of a car, showing my improved fender attached. Fig. 3 is a vertical section showing the fender drawn in under the platform of the car. Fig. 4 is a bottom plan view of a car and fender, showing the use of sprocket wheels and chains to operate the fender. Fig. 5 is a cross-section of one of the tubular guideways with one of the side members of the fender-frame therein.

In the drawings, 1 represents the front or rear platform of a power-driven street-car.

2 represents tubes open at their front ends and slotted from their front ends inwardly a suitable distance, as shown at 3, supported in or by hangers 4, secured to the lower surface of the car-body. Said hangers are of increasing length from the rear to the front, whereby the slotted tubes 2 will be held at an inclination, the forward end of each tube projecting downwardly.

5 represents the fender, consisting of front and side members and the net, as is usual in this type of fenders. The front and side members $5^a$ and $5^b$ $5^b$ of the fender-frame are usually constructed of piping and are braced at the back by the transverse bar 6.

7 is a staff journaled through the motorman's platform 1 and having secured to it above said platform the ratchet-wheel 8. A pawl 9 is pivoted to the platform and engages the teeth of the ratchet-wheel to lock it and the staff against turning. The upper end of the staff is provided with a crank-handle, as is usual on cars of this type. To the lower end of staff 7, below the platform 1, is secured the drum 10, having a grooved periphery or rim 11, hub 12, and spokes 13.

14 is a cable or chain fastened at its ends to the spokes of the drum or to the periphery of the drum and wound in the groove therein in opposite directions and passing outwardly around pulleys 15, mounted on the lower face of the platform near the side edges thereof, and thence rearwardly around another horizontal pulley 16, mounted in bearings 17, secured to a block 18, which is secured to the bottom of the car-body above the wheel-truck.

19 is a rod or bar pivotally secured at its front end to the transverse brace-bar 6 and at its rear end secured to one of the side rims of the cable or chain 14. Said rod or bar 19 is secured to the transverse bar 6 near the point where it is secured to one of the side members of the fender-frame, and one only of said bars 19 is used and at only one side of the fender-frame.

If desired, the drum and horizontal pulleys may have sprocket-teeth, and a sprocket-chain may be used instead of a cable or chain, as is shown in Fig. 4 of the drawings.

While the car is running the fender-frame is drawn under the car-platform by the motorman turning the staff 7, and through the medium of the cable or chain wound on the drum in opposite directions and the link or rod connecting the fender with the said cable or chain, causing the side members of the said fender-frame to slide rearwardly in the slotted tubes secured to the body of the car. If now the motorman wishes to use the fender, he pushes the pawl out of engagement with the teeth of the ratchet-wheel secured to the staff 7 and by means of the crank-handle at the upper end of the staff turns said staff, causing the end of the cable to run from the side of the car on which the link or rod 19 is secured to the fender-frame and cable to wind on the drum and the other end of the cable to unwind from the same. This will cause the fender-frame to slide forward by the side members of the same sliding in the slotted tubes 2 outwardly and downwardly by reason of the fact that the said slotted tubes are inclined downwardly to the front at an angle. As the slotted tubes carrying the side members of the fender-frame are inclined downwardly to the front, the front end of the fender may be brought very close to the ground, so that nothing can get under the fender, but will be caught by the fender and dropped back upon the same. The motorman can lock the fender at any point in its forward or backward travel or can withdraw it entirely under the platform out of the way, as will be particularly desirable where two cars are approaching each other on a curved track and will allow them to pass each other without the fenders striking each other or any part of the car-truck.

It will thus be seen that I have provided an extremely simple and efficient car-fender, one which can be instantly manipulated by the motorman and one in which the necessity for swinging out of the way at the end of the line is done away with.

The fender, it will be noticed, can be drawn entirely under the platform of the car and housed so as to protect it from the elements.

Having thus described my invention, what I claim as new, and desire to secure by Letters Patent, is—

1. In a car-fender a horizontally-inclined frame supported in guideways from the car-platform, a horizontal drum mounted on the under side of the platform, a cable or chain secured at its ends to the periphery of said drum and wound thereon in opposite directions, horizontally-mounted guide-pulleys secured to the car-platform, a link connecting the frame at one side with one of the side runs of the cable or chain, and means for rotating said drum.

2. In a car-fender, a horizontally-inclined frame slidably supported in guideways, beneath the car, a horizontal drum mounted beneath the car, a cable or chain secured at each end to the periphery of said drum and wound thereon in opposite directions, horizontal pulleys mounted beneath the car at each side of the horizontal drum and around which the side runs of the cable or chain pass, a horizontal pulley mounted beneath the car directly in the rear of the drum and around which the cable or chain passes, a link pivotally connected at one end to one side of the fender-frame and at the other end to one side run of the cable or chain, and means for rotating the drum, to cause a forward or rearward sliding movement of the fender-frame in its guideways.

3. In a car-fender a horizontal frame slidably supported in guideways beneath the car, a horizontal drum mounted beneath the car-platform, a belt secured at each end to the periphery of said drum and wound thereon in opposite directions, guide-pulleys mounted beneath the car-platform at each side of the drum and around which the side runs of the belt pass, a guide-pulley mounted beneath the car directly in the rear of the drum, a link pivotally connected at its front end to the fender-frame and at its rear end to one of the side runs of the belt, and means for rotating the drum and locking the fender at any point in its forward or backward travel.

WESLEY GEORGE WINANS.

Witnesses:
A. LAUBER,
H. H. WELLS.